(12) United States Patent
Ruzyski et al.

(10) Patent No.: US 7,810,143 B2
(45) Date of Patent: Oct. 5, 2010

(54) CREDENTIAL INTERFACE

(75) Inventors: David M. Ruzyski, Kirkland, WA (US);
James H. Hong, Seattle, WA (US);
Brian K. McNeil, Seattle, WA (US);
Chris J. Guzak, Kirkland, WA (US);
Brian D. Wentz, Seattle, WA (US);
Klaus U. Schutz, Kirkland, WA (US);
Stefan Richards, Scappoose, OR (US);
Eric C. Perlin, Redmond, WA (US);
Cristian Ilac, Sammamish, WA (US);
Sterling M. Reasor, Bellevue, WA (US);
Eric R. Flo, Olympia, WA (US); John Stephens, Redmond, WA (US);
Benjamin A. Hutz, Providence, RI (US)

(73) Assignee: Microsoft Corporation, Redmond, WA (US)

( * ) Notice: Subject to any disclaimer, the term of this patent is extended or adjusted under 35 U.S.C. 154(b) by 984 days.

(21) Appl. No.: 11/112,844

(22) Filed: Apr. 22, 2005

(65) Prior Publication Data

US 2006/0242427 A1 Oct. 26, 2006

(51) Int. Cl.
*G06F 7/04* (2006.01)
*G06F 15/16* (2006.01)
*G06F 17/30* (2006.01)
*H04L 29/06* (2006.01)

(52) U.S. Cl. .......................................... 726/5; 380/277

(58) Field of Classification Search ................. 380/278, 380/277; 705/76; 726/3, 6, 4, 8, 5; 713/168, 713/182; 709/217
See application file for complete search history.

(56) References Cited

U.S. PATENT DOCUMENTS

| | | | |
|---|---|---|---|
| 5,655,077 A | 8/1997 | Jones et al. |
| 5,774,551 A | 6/1998 | Wu et al. |
| 5,864,665 A | 1/1999 | Tran |
| 6,473,794 B1 | 10/2002 | Guheen et al. |
| 6,609,198 B1 | 8/2003 | Wood et al. |
| 6,643,690 B2 | 11/2003 | Duursma et al. |
| 6,651,168 B1 | 11/2003 | Kao et al. |
| 6,795,855 B2 | 9/2004 | Bonilla et al. |
| 6,799,178 B2 | 9/2004 | Iwase et al. |
| 6,807,636 B2 | 10/2004 | Hartman et al. |

(Continued)

FOREIGN PATENT DOCUMENTS

RU  2158444 (C2)  10/2000

(Continued)

OTHER PUBLICATIONS

Lai, C. ; User authentication and authorization in the Java platform; Publication Date: 1999; INSPEC ; On pp. 285-290.*

(Continued)

*Primary Examiner*—Kambiz Zand
*Assistant Examiner*—Monjour Rahim
(74) *Attorney, Agent, or Firm*—Lee & Hayes, PLLC

(57) ABSTRACT

Systems and/or methods are described that enable a credential interface. These systems and/or methods may build a credential user interface enabling a user to choose between multiple credentials and submit an authenticator for a chosen credential. These systems and/or methods may also gather information about arbitrary credentials and build a user interface for submission of authenticators for these arbitrary credentials.

20 Claims, 6 Drawing Sheets

U.S. PATENT DOCUMENTS

| | | | |
|---|---|---|---|
| 6,982,962 B1 | 1/2006 | Lunsford et al. | |
| 7,065,360 B2 | 6/2006 | Yahagi | |
| 7,152,164 B1 | 12/2006 | Loukas | |
| 7,178,025 B2* | 2/2007 | Scheidt et al. | 713/168 |
| 7,305,709 B1 | 12/2007 | Lymer et al. | |
| 2002/0031230 A1* | 3/2002 | Sweet et al. | 380/278 |
| 2002/0038333 A1 | 3/2002 | Evans et al. | |
| 2002/0112155 A1 | 8/2002 | Martherus et al. | |
| 2002/0186260 A1 | 12/2002 | Young | |
| 2003/0046392 A1 | 3/2003 | Wen et al. | |
| 2003/0065626 A1* | 4/2003 | Allen | 705/76 |
| 2003/0097574 A1 | 5/2003 | Upton | |
| 2003/0177388 A1 | 9/2003 | Botz et al. | |
| 2003/0182586 A1* | 9/2003 | Numano | 713/202 |
| 2003/0212904 A1* | 11/2003 | Randle et al. | 713/200 |
| 2004/0034704 A1 | 2/2004 | Connelly | |
| 2004/0039909 A1 | 2/2004 | Cheng | |
| 2004/0088405 A1 | 5/2004 | Aggarwal | |
| 2004/0117358 A1 | 6/2004 | von Kaenel et al. | |
| 2004/0139355 A1 | 7/2004 | Axel et al. | |
| 2004/0210771 A1* | 10/2004 | Wood et al. | 713/201 |
| 2004/0243824 A1 | 12/2004 | Jones | |
| 2005/0091213 A1 | 4/2005 | Schutz et al. | |
| 2005/0108770 A1 | 5/2005 | Karaoguz et al. | |
| 2005/0132070 A1 | 6/2005 | Redlich et al. | |
| 2005/0188313 A1 | 8/2005 | Matthews et al. | |
| 2005/0188314 A1 | 8/2005 | Matthews et al. | |
| 2005/0188317 A1 | 8/2005 | Matthews et al. | |
| 2005/0235148 A1* | 10/2005 | Scheidt et al. | 713/168 |
| 2005/0268107 A1* | 12/2005 | Harris et al. | 713/182 |
| 2006/0075475 A1* | 4/2006 | Boulos et al. | 726/6 |
| 2006/0085752 A1 | 4/2006 | Beadle et al. | |
| 2006/0165060 A1* | 7/2006 | Dua | 370/352 |
| 2006/0174308 A1 | 8/2006 | Fuller et al. | |
| 2006/0174323 A1* | 8/2006 | Brown et al. | 726/3 |
| 2006/0242427 A1 | 10/2006 | Ruzyski et al. | |
| 2007/0106892 A1* | 5/2007 | Engberg | 713/168 |
| 2007/0186106 A1* | 8/2007 | Ting et al. | 713/168 |

FOREIGN PATENT DOCUMENTS

| | | |
|---|---|---|
| RU | 2003102377 A | 6/2004 |
| RU | 2237275 C2 | 9/2004 |
| WO | WO0111451 (A1) | 2/2001 |

OTHER PUBLICATIONS

Gamma, E. et al., "Design Patterns", 1995, Addison-Wesley, Reading, MA, USA, pp. 139-143, 148-150.

Pittaway, et al., "Distributed security services in Microsoft Windows NT 5.0—Kerberos and the active directory", Information Security Technical Report, Elsevier Advanced Technology, vol. 4, 1999, pp. 20-21.

Wiseman, et al., "Adding Security Labelling to Windows NT", Information Security Technical Report, Elsevier Advanced Technoloy, vol. 4, 1999, p. 20-21.

European Search Report for European Patent Application No. 04019100.9 Mailed on Feb. 2008, pp. 6.

Andress et al., "Test Center-New Products Test In Real-World Environments", Trinity 3.3, Information Security Magazine, Jan. 2002. Retrieved from the Internet.

Rathbone, "Windows XP for Dummies", Wiley Publishing Inc, 2001, pp. 62-64, 66, 106-107, 128 and 314.

Debian Admin, "Enable and Disable Ubuntu Root Password", Sep. 28, 2006, http://www.debianadmin.com/enable-and-disable-ubuntu-root-password.html, 9 pgs.

Debian Administration, "Giving Ordinary User Root Privileges, Selectively.", Oct. 16, 2004, Steve Kemp, retrieved at http://www.debian-administration.org/articles/33/print, 3 pgs.

"Direct User Switching Task for Windows XP", Aug. 24, 2003, retrieved at http://web.archive.org/web/20030824072430/www.waybeyonduk.com/DUST/, 4 pgs.

"GKSU: A Gtk+ Su Front End Linux Man Page" retrieved Apr. 1, 2009 at http://www.penguin-soft.com/peguin/man/1/gksu. html, 2 pgs.

Ha,"Red Hat Linux Getting Started Guide", Red Hat Docs., Apr. 8, 2003, Red Hat, Incorporated, retrieved at http://web.archive.org/web/20030418075045/http://www.redhat.com/docs/manuals/linux/RHL-p-Manual/getting-started-guide/, 174 pgs.

Ha, "Red Hat Linux Security Guide", Red Hat Docs, Apr. 8,2003, retrieved at http://web.archive.org/web/20030418075045/http://www.redhat.com/docs/manuals/linux/RHL-9-Manual/getting-started-guide/, 106 pgs.

Lawrence, "Using Sudo", Linus Tutorials, May 12, 2005, retrieved at http://web.archive.org/web/20050530041932/www.developertutorials.com/tutorials/linux/using-sudo-050511/page1.html, 4 pgs.

Learning the Shell, "Permissions", retrieved Mar. 27, 2009 at http://www.linuxcommand.org/Its0070.php, Lesson 7, 5 pgs.

Linuxtopia, "Ubuntu FAQ Guide: Chapter 6- Users Administration", May 31, 2005, retrieved at http://web.archive.org/web/20060523005037/http://linuxtopia.org?online_books/system_administration_books/ubuntu_starter_guide/index. html, 8 pgs.

Man Pages "Ls.", retrieved at http://www.linuxcommand.org/man_pages/Is1.html, on Apr. 9, 2009, 5 pgs.

Microsoft Help and Support, "How to Make Files and Folders Private in Windows XP so That Only You Have Access to Them", retrieved Mar. 31, 2009 at http://support_microsoft.com/kb/930987/en-us, 2 pgs.

Miller, "Sudo Manual", Jul. 11, 2004 retrieved at http://web.archive.org/web/20040711020526/http://www.gratisoft.us/sudo/man/sudo.html, 8 pgs.

Miller, "Sudoers Manual", Jul. 11, 2004, retrieved at http://web.archive.org/web/20040711020555/www.gratisoft.us/sudo/man/sudoers.html, 18 pgs.

"Quick HOWTO: Ch09 : Linxus Users and Sudo", Dec. 23, 2005, retrieved at http:web.archive.org/web/20060203023004/http://www.linuxhomenetworking.com/wiki/index.php/Quick_HOWTO_:_Ch09_:_Linux_Users_and Sudo, 8 pgs.

Sweet et al., "KDE 2.0 Development: 5.3. Standard Dialog Boxes", 2000, retrived at http://developer.kde.org/documentation/books/kde-2.0-development/index.html, 23 pgs.

The Elder Geek on Windows XP, "Switch User in Windows XP", retrieved Mar. 27, 2009 at http://web.archive.org/web/20041215071735/theeldergeek.com?HT0_005.htm, 4 pgs.

"The KDE su Command", Nov. 20, 2004, retrieved at http://www.linfo.org/kdesu.html, 4 pgs.

"The Ubuntu Quick Guide. Chapter 3. Applications Menu: System Tools.", retrieved Mar. 30, 2009 at http://people.ubuntu.com/~mako/docteam/quickguide/ch03s07.html, 10 pgs.

Ubuntu Documentation RootSudo, Dec. 31, 2005, retrived at https://help.ubuntu.com/community/RootSudo, 7 pgs.

Using Windows XP, Computer Setup and Maintenance, "How to Swtich Between Users" Sep. 7, 2006, retrieved at http://www.microsoft.com/windowsxp/using/setup/winxp/switchusers.mspx, 3 pgs.

Barkley, "Principle of Least Privilege", retrieved on Oct. 16, 2009 at <<http://hissa.nist.gov/rbac/paper/node5.html>>, National Institute of Standards and Technology, Jan. 9, 1995, 1 page.

"How To Use the Fast User Switching Feature in Windows XP", retrieved on Oct. 16, 2009 at <<http://web.archive.org/web/20041212131045/http://support.microsoft.com/kb/279765>>, Microsoft Help and Support, Jul. 15, 2004, pp. 1-3.

Habraken, "Novell Linux Desktop 9 User's Handbook", Novell Press, 2005, pp. 32-34, pp. 151-153.

Microsoft Computer Dictionary Definitions, "Accelerator, Hot Keys, and Shift Key", Microsoft Press 2002, 8 pgs.

\* cited by examiner

CREDENTIAL INTERFACE

TECHNICAL FIELD

This invention relates to user interfaces used to authenticate a person's identity.

BACKGROUND

Credentials may be used to determine whether or not persons are who they say they are. Assume, for instance, that a man walks up to a bank teller and says his name is "J. Warren Smalley" and that he would like to withdraw two hundred dollars from a checking account held by J. Warren Smalley. The bank teller may use a credential to determine if this man really is J. Warren Smalley. Banks often use documentary credentials, like a passport or drivers license having a photo and name. If this man looks like the man pictured on the document and the document says that the picture is of J. Warren Smalley, the bank may authenticate that this man really is J. Warren Smalley.

The bank may also use other types of credentials, like a secret or something unique to a particular person. The bank may authenticate that this man is J. Warren Smalley if they have a record showing J. Warren Smalley's signature—something unique to J. Warren Smalley—and this man's signature matches the signature on the record. The bank may also authenticate this man with a secret, like a password. Thus, if this man submits to the bank teller a personal identification number (PIN) matching the PIN for J. Warren Smalley, the bank may authenticate that this man is who he says he is.

Computers also interact with people to identify them, often using a name/password pair as their primary credential to do so. Many computer operating systems, for instance, require a user to submit a password for authentication. To enable this interaction, the operating system may present a graphical user interface. This interface may show accounts associated with various users, enable the person to select one of these accounts, and enable entry of a password for the selected account. The operating system may then receive an entered password and authenticate that this password identifies a user associated with the selected account. The operating system may then log that person on, permit a certain action, or the like.

This graphical user interface, however, often enables only a single credential type—a username and password—by which a user may be authenticated. This can be a problem if other credential types are desired or later developed. If some company develops a credential type that is superior to or at least useful in conjunction with a username/password credential, the company may have to create a new graphical user interface to enable use of this credential type. Assume the company develops a type of credential based on a person's thumb print. The company may sell scanners that scan people's thumbs and software capable of authenticating that a scanned thumb matches a particular person. To enable computers to use this credential however, the company may have to write a new user interface replacing password-based ones often used by computers. This new user interface may take many weeks or months for skilled programmers to design.

Also, even if a company designs this new user interface, another company may come along with another credential type, such as a retina-based credential. In this case, the retina-scanning company may need to create another user interface for computers to use its retina-based credential. And this user interface may not be able to handle a thumb-print-based credential. If a corporation or the government wants to authenticate a person with a password, a thumb print, and a retina scan, it may not be able to do so without creating yet another user interface costing even more time and effort.

SUMMARY

Systems and/or methods ("tools") are described that enable credential presentation and/or gathering. In some embodiments the tools build a graphical credential interface enabling a user to choose between and/or submit multiple types of credentials. The tools may also, in another embodiment, gather credentials of arbitrary types and build a user interface for submission of these arbitrary types of credentials.

BRIEF DESCRIPTION OF THE DRAWINGS

The same numbers are used throughout the disclosure and figures to reference like components and features.

DETAILED DESCRIPTION

Overview

The following disclosure describes one or more tools enabling a credential interface. In one embodiment, the tools create a credential interface enabling a user to choose between and/or submit multiple types of credentials. This may aid users in that a user may choose to submit a thumbprint authenticator for a credential instead of a password authenticator for a name/password credential, such as if the user has forgotten his or her password. It may also enable a greater degree of confidence that a user is correctly identified by enabling a user to submit multiple authenticators, like a password and a retina scan.

In another embodiment, the tools gather information about arbitrary types of credentials and build a user interface for submission of authenticators for these arbitrary types of credentials. By so doing, credential providers may forgo building a user interface for their credential, potentially saving them significant time and effort.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any one particular operating environment.

Figure 1:
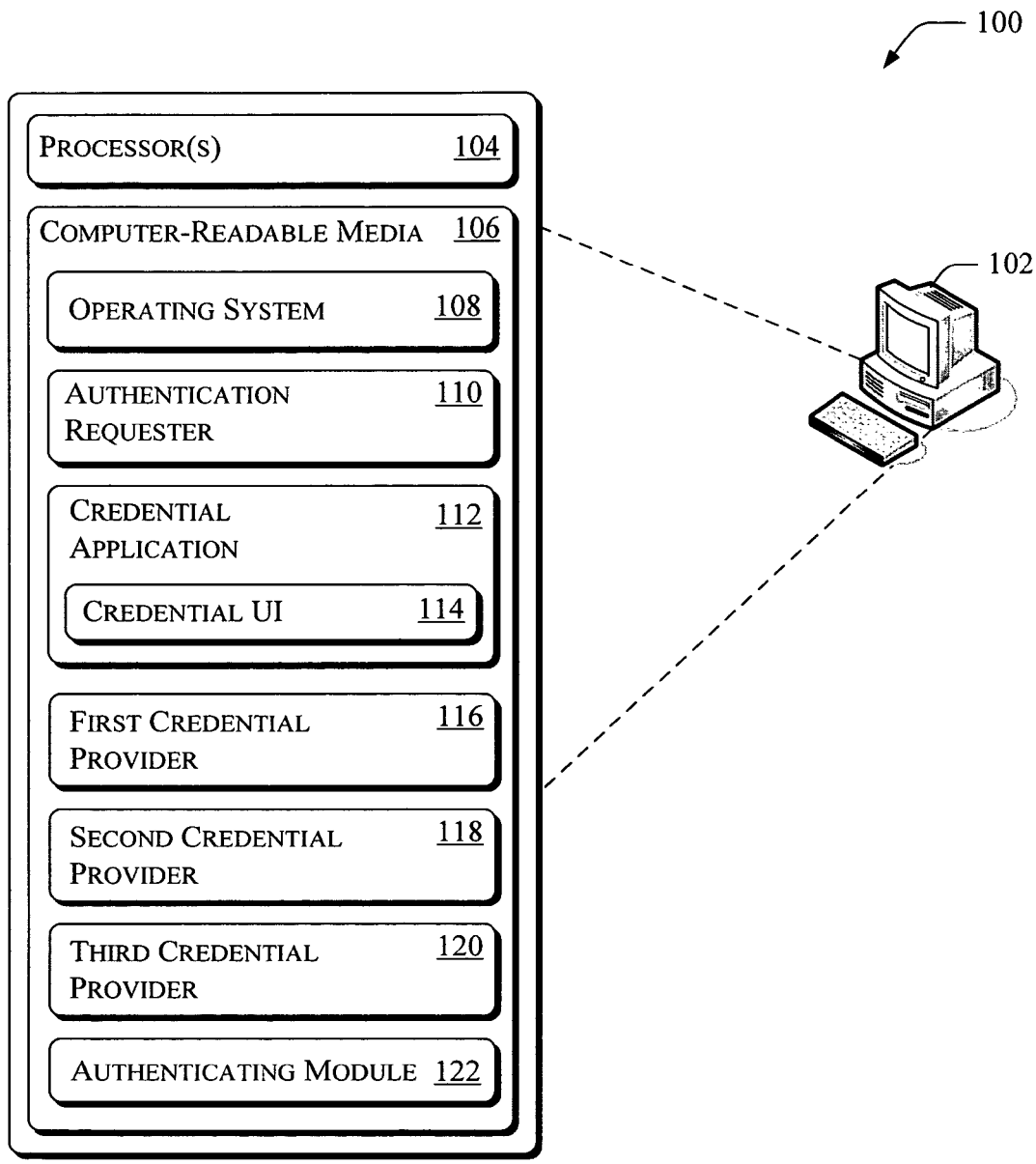
FIG. 1 illustrates an exemplary operating environment in which various embodiments can operate.

FIG. 1 illustrates one such operating environment generally at 100 comprising a computer 102 having one or more processor(s) 104 and computer-readable media 106. The processor(s) are capable of accessing and/or executing the computer-readable media. The computer-readable media comprises an operating system 108, authentication requester 110, credential application 112 having a credential user interface 114, a first credential provider 116, a second credential provider 118, a third credential provider 120, and an authenticating module 122.

Authentication requester 110 may comprise software, an applet, a module, or other entity that is capable of requesting authentication of a person. The requester may be part of or comprise security portions or programs of the operating system, controlled-access software, such as parental-control software, and the like.

Credential application 112 enables credential user interface 114. The credential application may build or tailor the credential user interface, in some cases by gathering credentials of arbitrary types and from arbitrary sources, like first, second, and third credential providers 116, 118, and 120. The credential user interface may also be built to enable a user to select and submit authenticators for one credential or several.

The credential providers provide information about their credentials. In one embodiment the credential providers provide information about their credentials and basic information about what, in a user interface, the credential provider prefers. This may comprise information indicating a preference for a data-entry field along with text explaining their credential, how the field should be presented in the user interface, and the like. In an embodiment described below, the first credential provider is integral or associated with operating system 108 and comprises a name/password credential.

Authenticating module 122 may be integral with or separate from each of the credential providers. There may be multiple authenticating modules, such as one for each credential provider, or one authenticating module. The authenticating module is capable of determining whether or not a credential's authenticator submitted through the credential user interface authenticates a particular identity or account associated with the credential. How it does so may be dictated by the credential provider for the submitted credential or otherwise.

Various embodiments of these elements of computer 102, and particularly how these elements act and interact to perform an exemplary process and produce an exemplary user interface, are set forth in greater detail below.

Logging Onto an Operating System

There are many instances where a computing device may be used to authenticate a person with a credential. One of these cases is logging a person onto a computer's operating system. The following discussion describes exemplary ways in which elements of operating environment 100 enable a person to log on to computer 102's operating system 108 with one or more credentials. This discussion is not intended to limit the scope or applicability of the tools to logging a person onto an operating system.

Figure 2:
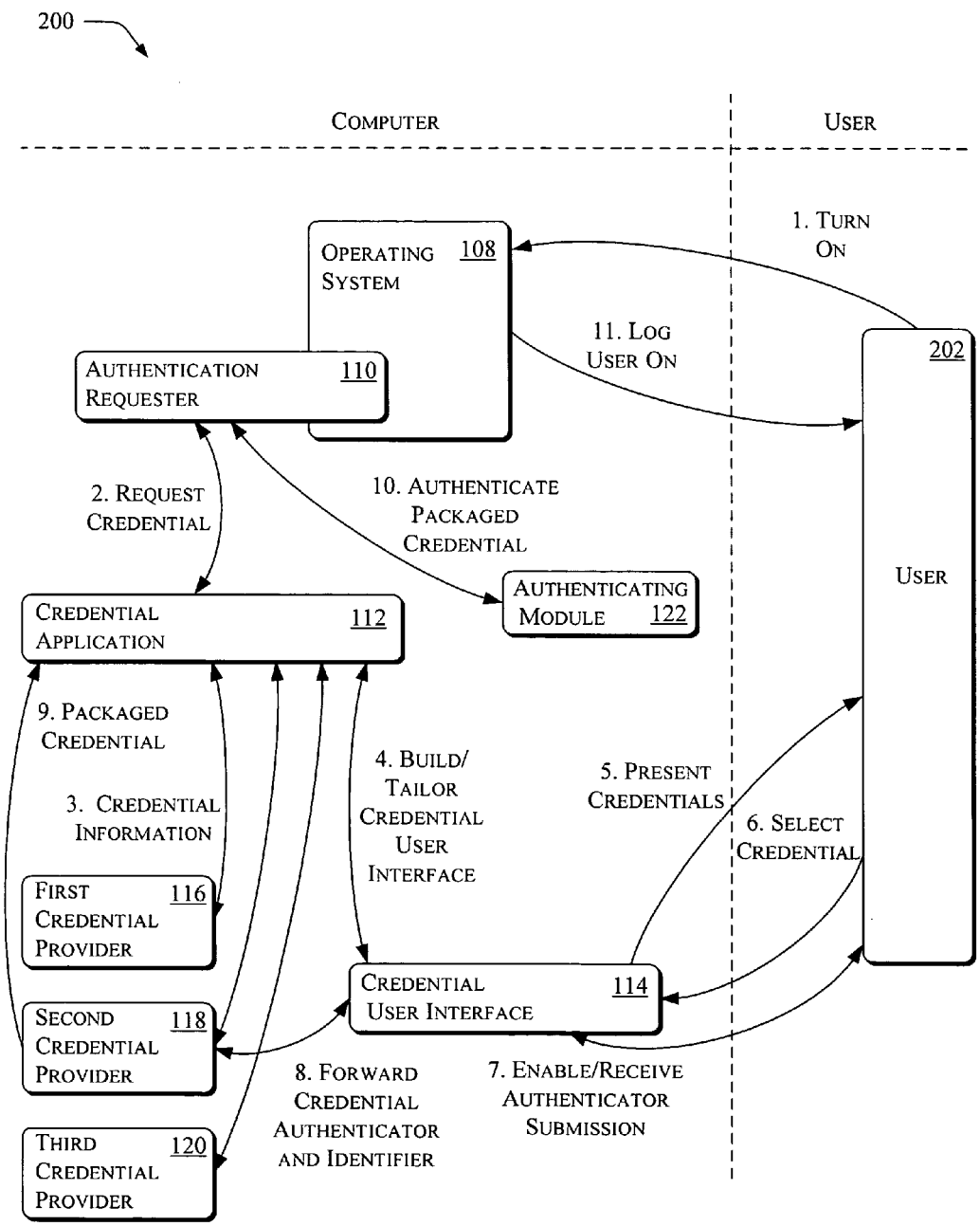
FIG. 2 is an exemplary flow diagram for building a credential user interface enabling a user to logon to an operating system.

Referring to FIG. 2, an exemplary flow diagram 200 for enabling a user to log on to an operating system is shown. Flow diagram 200 illustrates a set of actions by, and accompanying communications between, elements of the environment 100 and a user 202—here the elements shown are operating system 108, authentication requester 110, credential application 112, credential user interface 114, credential providers 116, 118, and 120, and authenticating module 122. The actions and accompanying communications are marked with arrows. The flow diagram is oriented showing computer element actions and user actions, communication between the computer and the user represented by lines passing through a dashed line separating the two. This flow diagram may be implemented in any suitable hardware, software, firmware, or combination thereof. In the case of software and firmware, this diagram represents sets of operations implemented as computer-executable instructions (except those of the user).

At arrow 1, user 202 turns computer 102 on or otherwise indicates a desire to log on to operating system 108. On receipt of this indication, the operating system requests, directly or indirectly, that user 202 be authenticated, resulting in communication with the credential application at arrow 2 to gather an appropriate credential for authentication. In some cases the operating system is not the authentication requester, such as when a user is already logged in and authentication is requested by parental-control software. In the illustrated embodiment, however, the operating system is also the authentication requester, shown with the boxes of the operating system and the authentication requester overlapping.

At arrow 3, credential application 112 receives credential information from one or more credential providers. Here first, second, and third credential providers 116, 118, and 120 are previously registered with the credential application. The credential application may have previously received the credential information or may request and receive it at this point. The credential application submits the credential information to credential user interface 114 through a pre-defined API.

The credential information comprises information about the credential and information sufficient for credential application 112 to build or tailor a user interface to enable a user to select and submit a credential for the selected type (or a selected provider and type if one type has multiple providers).

In the illustrated embodiment, first credential provider 116 comprises a password-type of credential. The provider 116 is code or a database associated with or integral with operating system 108. The credential information for the password credential comprises: a list of field types necessary to render the credential in the user interface (such as a static text field type for the user name and an edit box field type for the password); the state of each field (such as hidden, read-only, disabled, focused); an accessibility label for each field; and data associated with the field.

This credential information indicates that the following text (but not the shape, color, or size of the text) should be presented to the user:

Authenticate With Password?

The credential information also indicates that text and a data-entry field should be displayed if the password credential is selected, such as a data-entry field along with the following text:

Submit Password and Press Enter.

Second credential provider 118 comprises a thumb-print-type of credential. The provider 118 sends credential information to the credential application sufficient for the credential application to build a user interface enabling a user to submit this biometric-type credential. Here the credential information comprises credential data and credential viewing data. The viewing data comprises an indication that the following text should be presented to a user for the user to select this credential:

Authenticate With Thumb Scan?

And the name of the credential provider:

Acme Biometrics

The viewing data also comprises text to be displayed if the thumb scan is selected:

Place Right Thumb on Thumb Reader, Hold For At Least One Second.

Third credential provider 120 comprises a voice-recognition-type of credential. Provider 120 sends credential information sufficient for the credential application to enable receipt of a voice credential. The credential information also comprises an indication that the following text should be presented to a user for the user to select this credential:

Authenticate With Voice Scan?

And the name of the credential provider:

Advanced Audio Recognition

This information also comprises other text to be displayed if the voice credential is selected:

Please Say the Following Into Your Computer's Microphone: "One, Two, Buckle My Shoe."

At arrow 4, credential application 112 builds and/or tailors a credential-gathering user interface based on the credential information. Here the credential application tailors the credential user interface to present the three credentials mentioned above.

At arrow 5, credential user interface 114 displays selectable credentials to user 202. The credential user interface may display the credentials and enable the user to select them directly, such as by clicking on the text or accompanying graphic or indirectly by submitting an authenticator for a credential.

Figure 3:
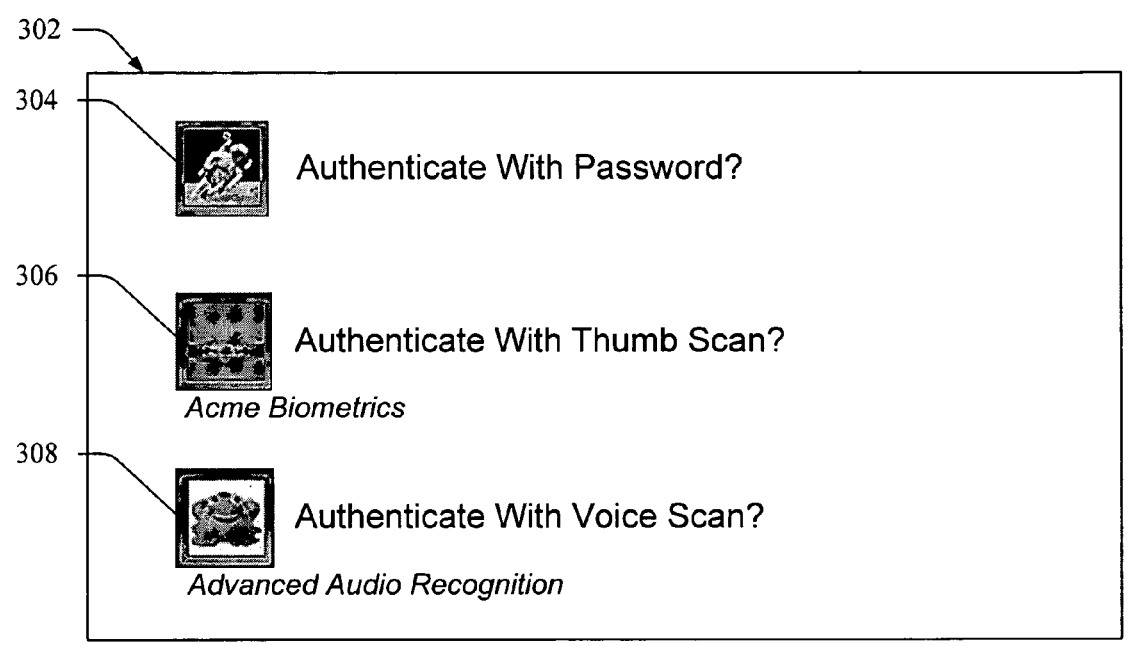
FIG. 3 illustrates an exemplary graphical user interface having three selectable types of credentials.

Referring to FIG. 3, a logon credential interface 302 is shown. The logon credential interface presents three types of credentials and enables the user to select one of these three. The first is a name/password credential, shown at 304, the second is a thumb credential shown at 306 (comprising an identifier for a user or account and a thumb-scan authenticator), and the third is a voice-recognition credential shown at 308 (comprising an identifier for a user or account and a voice-recognition authenticator).

The logon credential interface is tailored to the credential providers from which credential information was received. In this embodiment, the phrases "Authenticate With Password", "Authenticate With Thumb Scan?", "Acme Biometrics", "Authenticate With Voice Scan", and "Advanced Audio Recognition" were built into the interface. Each of these credential options is also shown with an optional graphic. Here the graphics are selected by the credential providers from a pre-built library accessible by the credential provider.

At arrow 6, user 202 selects one of the credentials. In some embodiments, the user may select a credential that is built from multiple authenticator types (e.g., the selected credential requires both a password and a thumbprint scan) instead of a single one. In the illustrated embodiment, the user selects one of the credentials, here thumb credential 306. Also at arrow 6, the credential user interface receives the user's selection.

At arrow 7, credential user interface 114 enables submission of an authenticator. In some cases the credential user interface does so by presenting a data-entry field for submission of an authenticator associated with the credential, such as a password or the like. In other cases a data-entry field or graphical user interface is not used.

Figure 4:
FIG. 4 illustrates an exemplary graphical user interface tailored to submission of a thumb credential.

Referring to FIG. 4, a logon credential interface 402 tailored to submission of an authenticator of a thumb credential is shown. The credential 1 interface comprises instructions 404 for the user. Here they are based on the credential information received at arrow 3 above. These instructions inform the user that to submit the thumb authenticator, the user must "Place Right Thumb On Thumb Reader, Hold For At Least One Second." The thumb reader comprises hardware and/or software capable of receiving the thumb authenticator, here a biometric scanning device.

Also at arrow 7, credential user interface 114 receives submission of the thumb authenticator from user 202.

At arrow 8, on receipt of this authenticator, the credential user interface may forward an authenticator and identifier for the credential (here the submitted authenticator and an identifier associated with the credential, such as an account name) to the appropriate credential provider (here second credential provider 118). The credential user interface may forward this data directly to the credential provider or through credential application 112 (not shown). The credential provider may then package the submitted authenticator with an identifier (both of which are associated with the credential) in a credential form understandable by authenticating module 122. The authenticator may be packaged into a particular type or form, such as eXtensible Markup Language (XML), that indicates the shape and other defining characteristics of the scanned thumb.

At arrow 9, the credential provider may package the authenticator and identifier and send this packaged credential to authentication requester 110. It may be forwarded from the credential provider through credential application 112 (shown). In this case, the credential application receives the packaged credential and then sends it on to the authentication requestor.

At arrow 10, authentication requestor 110 tenders the packaged credential to authenticating module 122. Here the authenticating module is one capable of authenticating a credential of the type sent from second credential provider 118. Also at arrow 10, authenticating module 122 analyzes the received credential, authenticates or fails to authenticate the credential, and communicates this determination. It may compare it to a database of credentials, match it to a particular user (if possible), and authenticate or refuse to authenticate the submitted credential. If refused, the elements may inform the user of the failure and provide help for the user. The ways in which the credential user interface informs the user and provides help may also be by default or tailored to the credential information received at arrow 3.

If the authenticating module authenticates the submission, it communicates this to authentication requester 110. In this illustrated embodiment, the authentication requester may communicate this directly to operating system 108.

In response to receiving the authentication, operating system 108 logs user 202 onto the operating system at arrow 11.

Enabling a Credential User Interface

The above-described exemplary flow diagram for logging a user onto an operating system is but one example of ways in which the tools enable computers to authenticate users using credentials. The following process further describes and provides additional embodiments of the tools.

Figure 5:
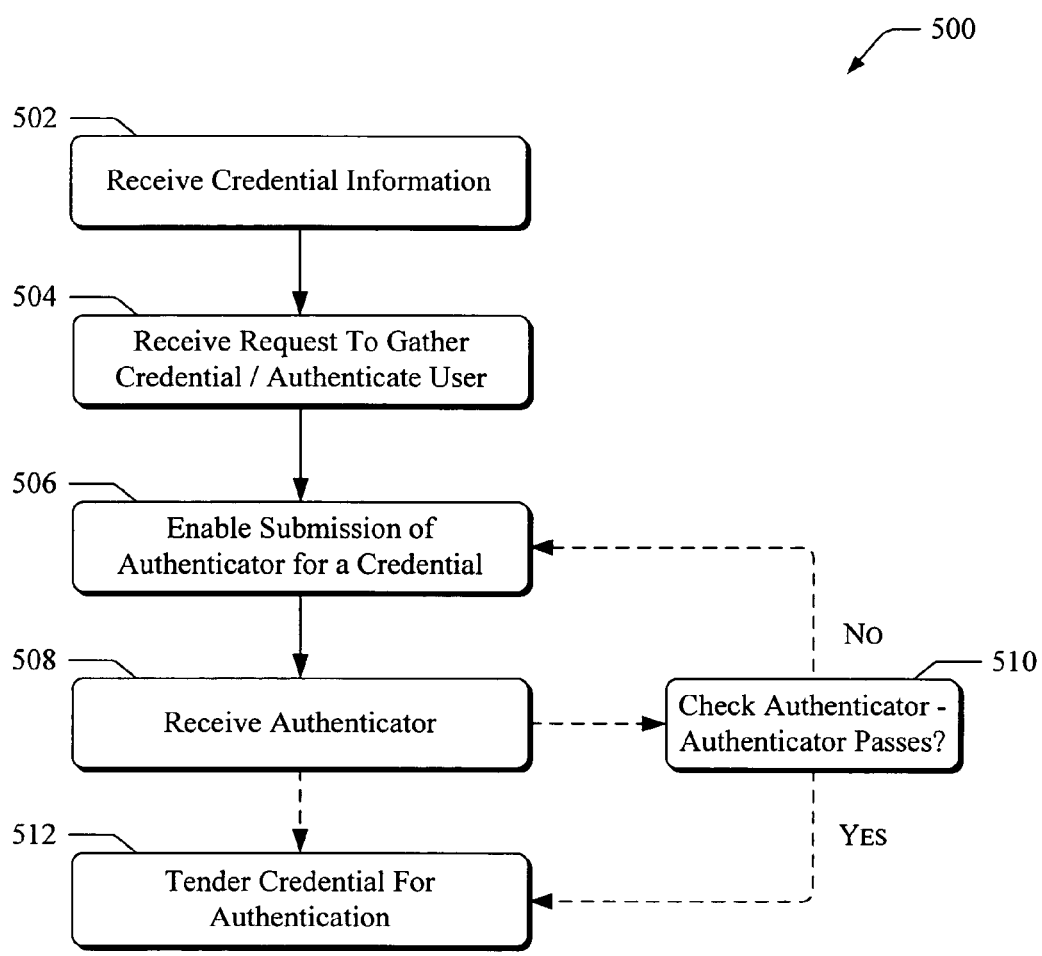
FIG. 5 is an exemplary process for gathering a credential using a credential user interface.

Referring to FIG. 5, a process 500 for enabling a credential user interface is shown. This process may be implemented in any suitable hardware, software, firmware, or combination thereof. In the case of software and firmware, this process represents sets of operations implemented as computer-executable instructions.

At block 502, the tools receive credential information. Credential information may be received from multiple credential providers and of multiple types. The credential types may comprise, for example, a thumb biometric, a retina biometric, a voice recognizer, a password, and a smart card. The type and origin of the credential may be arbitrary, even an as-yet-unknown type or provider. This ability helps permit the tools to create an extensible user interface for submission of credentials, which will be discussed below.

The credential information is of a type and format sufficient for the tools to enable submission of an authenticator for the credential. The type and format may be publicly available, such as on a publicly accessible website. This information may contain, for instance, an indication that certain types of data-entry fields are needed, questions or instructions that should be presented, graphics that should be shown, hardware or software protocols for receiving an authenticator, and the like. A graphic may be selected by the tools on default or based on the credential information received. When based on credential information received, the graphic may comprise a company's custom icon or an icon or graphic selected by the company from a pre-built library available to the provider and tools.

This information may be provided by a credential provider with less effort and greater reliability than would often be the case were the credential provider to instead create its own user interface. The credential information may also be of a type that does not expose proprietary authentication mechanisms and the like, as the tools do not necessarily perform authentication. The credential information may also, in one embodiment, be of types and received in a manner as set forth in logon flow diagram 200.

To receive the credential information, the tools may search through a credential registry for credential providers and ask each for credential information. The credential information may be received in a single or multiple steps, such as receiving credential information sufficient to present an option to a user and, if the user selects that credential, receiving additional credential information sufficient to enable submission of an authenticator for the credential.

At block 504, the tools receive a request to authenticate a user and/or gather one or more credentials. The tools may receive this request from an operating system, such as operating system 108 according to flow diagram 200. The tools may also receive this request from controlled-access software or directly from a user, such as when a user wishes to switch accounts, perform an action requiring authentication, and the like. The tools may receive and respond to various requesting entities residing throughout a computer's systems or process flow, including those only operating after the user has logged on.

At block 506, the tools enable a user to submit an authenticator and/or select the credential itself, such as by selecting an identity for a credential. The tools may do so through a graphic user interface or a non-visual interface.

The credential application may build or tailor a user interface sufficient for a user to select a credential (e.g., select an identity of the credential, such as by clicking on a name or icon for the credential) and submit an authenticator for a credential. The credential application may forgo significant visual customization to the credential user interface, however. By so doing, the user may view a consistent appearance for each of multiple credentials and credential providers. Also by so doing, a small amount of information may be received from the credential providers. The credential information may not need to include information instructing the credential application about how something needs to look given certain dots per inch (DPIs) on the computer's display, response protocols for WinLogon events, localization, keyboard accessibility, scrolling, and the like. But the tools build or tailor a user interface based in part on the credential information received; thus, if the credential provider indicates that a data-entry field is needed for entry of a password, it may present this data-entry field.

For a non-visual interface, the tools may enable a user to submit an authenticator and select a credential without visual prompting or instructions, such as by enabling receipt of a thumb scan simply by a user placing his or her thumb on a thumb scanner. In this case the credential information may comprise, for instance, questions or instructions that should be audibly generated through a computer's speaker system, a format of a submitted authenticator of which to enable receipt (here data from a thumb scan in a format generated by a particular type of thumb scanner), and hardware or software protocols for receiving an authenticator for a credential.

For graphical user interfaces, the tools may build a user interface presentable on a screen showing multiple credentials and/or sources of credentials. One example of this type of user interface is that shown in FIG. 3, where three credentials are presented.

Figure 6:
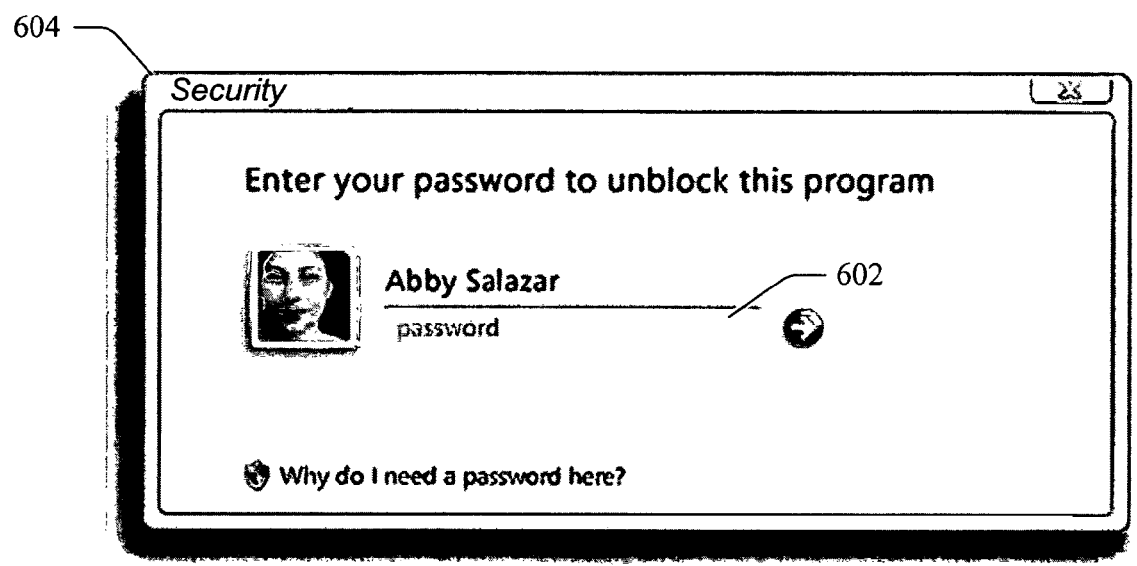
FIG. 6 illustrates an exemplary graphical user interface tailored to submission of a password credential.

FIG. 6 shows a data-entry field 602 enabling submission of a password authenticator for a name/password credential as part of a graphical user interface 604. Here the password authenticator may be used to authenticate that a user is "Abby Salazar", has a right to use the account entitled "Abby Salazar", and wishes to elevate her rights in order to unblock a particular program. Thus, the name/password credential identified with the name "Abby Salazar" may be authenticated with a submitted password.

The user interface may enable a user to select a single credential from multiple credentials (e.g., FIGS. 3 and 4), submit a single authenticator (e.g., FIG. 6), or select a single credential composed from multiple authenticators (thus requiring a user to submit multiple authenticators). In some cases, a user may submit an authenticator without a separate act of selecting the credential having that authenticator, such as simply by placing his eye next to a retina scanner without first selecting a retina credential from a list of credentials. An example of a user selecting a credential from multiple credentials is described as part of flow diagram 200 and shown in FIGS. 3 and 4.

At block 508, the tools receive submission of an authenticator from a user. In some embodiments the tools proceed directly to block 512. In some other embodiments, however, the tools preliminarily check the authenticator submitted before continuing (following block 510). If the credential information indicated that a password authenticator may not include spaces or mathematical symbols, for instance, the tools may check the submitted password for spaces and mathematical symbols. If none exist, the tools may proceed to block 512. If any do, the tools may indicate that the password submitted is of an incorrect form. The tools may do so as indicated by the credential information, such as with a statement "Spaces and Mathematical Symbols Are Not Permitted, Please Reenter Password" or in a default manner, such as "Password Is Of Improper Form, Please Reenter." This preliminary check may reduce how much time and resources are needed to authenticate a credential. For example, if a user submits an authenticator that will not be authentic and so must re-submit, the user may have to wait through two authentication processes. If, on the other hand, a submitted authenticator may be quickly determined to be inauthentic due to format or the like, performing one of the authentication processes may be avoided by instructing the user to re-submit the authenticator.

At block 512, the tools tender the credential associated with the submitted authenticator for authentication. The credential may be sent to separate authentication software, such as is described in flow diagram 200.

The credential tendered by the tools may enable other programs, such as a program that requested authentication of the user, to permit various actions like log a user onto an operating system, elevate the user's rights to permit a currently prohibited task, and the like.

Also, the tools may tailor a user interface differently at different times. The user interface is, in at least this sense, flexible and extensible. The tools may receive new credential information from new providers, for instance. Responsive to this, the tools tailor the user interface to permit selection of and submission of authenticators for these new credentials. Also, a credential provider may stop sending credential information or a system administrator may desire that the user interface have fewer credentials. In response to this change, the tools may alter the user interface to cease displaying a credential.

CONCLUSION

Systems and/or methods are described that enable a credential interface. This credential interface may enable credential providers to forgo building a user interface for their credentials, potentially saving them significant time and effort. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method, when executed by a computing device, cause the computing device to perform acts comprising:
registering a plurality of credential providers in a credential registry, the plurality of credential providers including a first credential provider that is integral to an operating system of the computing device, and a second credential provider at an arbitrary source that is separate from the operating system each of the plurality of credential providers authenticates one or more authenticators;
receiving multiple sets of credential information for multiple credentials from the plurality of credential providers in the credential registry, each set of credential information to enable tailoring of a portion of a graphical user interface to present one of the multiple credentials and to specify an acceptable credential type for the one of the multiple credentials;
receiving a request to authenticate a user; presenting the multiple credentials on the graphical user interface, the graphical user interface including a corresponding portion for each of the multiple credentials that is tailored based on its set of credential information;
receiving an authenticator specified by one of the multiple credentials that is of the acceptable credential type from the user; and authenticating the received authenticator at a corresponding credential provider.

2. The method of claim 1, wherein at least one of the multiple credentials comprises a biometric type of credential.

3. The method of claim 1, wherein the act of receiving the request comprises receiving the request from the operating system of the computing device, the operating system's request made in order to determine whether or not to log the user onto the operating system.

4. The method of claim 1, wherein the user is logged onto the operating system of the computing device and the act of receiving the request comprises receiving the request from controlled-access software, the controlled-access software's request made in order to determine whether or not to permit a currently prohibited task.

5. The method of claim 1, wherein the acceptable credential type includes one of a thumb biometric, a retina biometric, a voice recognizer, a password, and a smart card.

6. The method of claim 1, further comprising permitting the user to log onto the operating system when the received authenticator is authenticated.

7. The method of claim 1, further comprising receiving a selection of one of the multiple credentials presented on the graphical user interface.

8. The method of claim 1, wherein the act of receiving the request is performed prior to the act of receiving multiple sets of credential information.

9. One or more computer-readable storage device having computer-readable instructions therein that, when executed by a computing device, cause the computing device to perform acts comprising:
gathering sets of information associated with two or more credentials from a plurality of credential providers registered in a credential registry, the credential providers including a first credential provider that is integral to an operating system of the computing device, and a second credential provider at an arbitrary source that is separate from the operating system, each of the credential providers to authenticate one or more authenticators, the sets of information associated with the each of the credentials including instructions for submitting an authenticator for the each of the credentials to an authenticating entity;
tailoring a graphical user interface to display the sets of information associated with the two or more credentials;
presenting the graphical user interface, the graphical user interface enabling selection of at least one of the two credentials;
receiving at least one authenticator specified by the instructions for one of the credentials, from-the user.

10. The storage device of claim 9, wherein the act of gathering sets of information comprises requesting sets of information having a particular format.

11. The storage device of claim 9, further comprising authenticating each received authenticator at a corresponding credential provider.

12. The storage device of claim 9, wherein the act of gathering sets of information comprises gathering a set of information associated with one of the credentials, this set of information indicating that enabling submission of the authenticator for that credential requires a data-entry field and textual instructions to be presented on a graphical user interface.

13. The storage device of claim 12, wherein the act of tailoring the graphical user interface to the sets of information comprises adding the data entry field and the textual instructions to the graphical user interface.

14. The storage device of claim 9, wherein the act of tailoring the graphical user interface is performed without the sets of information comprising localization, keyboard accessibility, and scrolling instructions.

15. The storage device of claim 9, wherein one of the credentials requires two or more authenticators; and
further comprising:
enabling submission of the authenticators, receiving submission of the authenticators,
packaging the submitted authenticators with the credential requiring the authenticators effective to enable authentication of the credential, and
permitting a user to log onto an operating system when an authenticating entity authenticates the two or more authenticators.

16. The storage device of claim 9, further comprising, prior to the act of tailoring the graphical user interface, receiving a request to authenticate a user, the request received from an operating system of the computing device.

17. The storage device of claim 9, further comprising, responsive to receiving a selection of one of the credentials, altering the graphical user interface to enable submission of an authenticator for the selected credential.

18. One or more computer-readable storage device having computer-readable instructions therein that, when executed by a computing device, cause the computing device to perform acts comprising:

presenting, responsive to receiving a first set of information from a first credential provider, registered in a credential registry, a first portion of a graphical user interface that is tailored based on the first set of information to display a first set of credentials usable to authenticate a user, the first credential provider to authenticate one or more first authenticators;

presenting, responsive to receiving a second set of information from a second credential provider registered in the credential registry, a second portion of the graphical user interface that is tailored based on the second set of information to display a second set of credentials usable to authenticate the user, the second credential provider to authenticate one or more second authenticators, wherein the first set of credentials and the second set of credentials are of different types;

receiving an authenticator specified by the first set of information of the first set of credentials or the second set of information of the second set of credentials, the authenticator for authenticating the user; and packaging the authenticator into an eXtensible Markup Language (XML) package for transmission to a corresponding credential provider an authenticating entity, the XML package defining the characteristics of the authenticator.

19. The storage device of claim 18, wherein the first graphical user interface and the second graphical user interface are both capable of enabling the user to submit an authenticator.

20. The storage device of claim 19, further comprising permitting the user to log on to an operating system if the authenticating entity authenticates the authenticator.

* * * * *